June 20, 1967 W. LEHNER 3,326,603
VEHICLE SEAT, ESPECIALLY FOR AGRICULTURAL VEHICLES
Filed Oct. 23, 1965 2 Sheets-Sheet 1

United States Patent Office 3,326,603
Patented June 20, 1967

3,326,603
VEHICLE SEAT, ESPECIALLY FOR AGRICULTURAL VEHICLES
Wilhelm Lehner, Sebastian-Kneipp-Strasse 98, Amberg, Germany
Filed Oct. 23, 1965, Ser. No. 503,294
Claims priority, application Germany, June 15, 1965, G 43,875
12 Claims. (Cl. 297—308)

The present invention relates to a vehicle seat, especially for an agricultural vehicle, for example, a tractor, which is provided with an L-shaped supporting frame for the upholstery of the seat and a likewise L-shaped mounting frame which serves for mounting the seat on the vehicle and the rear part of which is designed so as to guide a pair of rollers which are mounted on the supporting frame. The seat is further provided with resilient suspension means consisting of a shock absorber and elastic elements which are secured at one end to the rear side of the supporting frame and at the other end to the rear part of the mounting frame.

There is a known seat of the type as described above in which the elastic elements consist of endless rubber cords which extend substantially in a horizontal direction. The depth of the seat structure, that is, its horizontal extent, is therefore relatively large. This hinders the driver of the vehicle from bending back over the back rest of the seat, for example, for connecting an agricultural machine to the vehicle or for disconnecting it therefrom.

A further disadvantage of this known seat structure is the fact that its suspension elements, that is, the rubber cords and shock absorbers, are partly or entirely exposed and therefore affected by the weather and other outside influences. Thus, for example, the rubber cords may be corroded by synthetic fertilizer. This known seat structure therefore requires special service. However, even such service is rendered very difficult by the fact that the suspension elements which are mounted on a common support can be removed or exchanged only by completely disassembling the seat structure.

It is an object of the present invention to provide a seat structure of the type as mentioned at the beginning which has a smaller depth than the known seat structure as described above and requires no service. For attaining this object, the invention provides that the elastic suspension elements which preferably consist of endless rubber cords extend substantially vertically and that these elements together with the shock absorber and the guide rollers are mounted within and are protected by a housing which is formed by the front and rear walls of the supporting and mounting frames. The suspension elements of the seat according to the invention are therefore protected from the influences of the weather as well as from dirt and other outside influences. The vertical arrangement of the elastic cords permits the housing to be made relatively shallow. Since this housing is partly formed by the rear sides of the two seat frames, it gives the seat a solid and compact design. It is in this connection also of considerable advantage that a bucket seat which is secured to the supporting frame is supported by lateral wall portions of the housing which project slightly beyond the front wall of the housing, that is, the rear side of the supporting frame. These lateral parts of the housing are adapted to take up the leverage forces which in the known seat structure, in which the bucket seat is secured to the supporting frame in a manner similar to a three-point suspension, may lead to a tilting of the bucket seat and in an extreme case even to a breaking-out of the securing means of the bucket seat.

These and further features and advantages of the present invention will become more clearly apparent from the following detailed description thereof which is to be read with reference to the accompanying drawings, in which—

FIGURE 2 shows, partly in section, a rear view of the seat in which the rear covering of the housing which encloses the suspension elements is omitted; while

Figure 1:
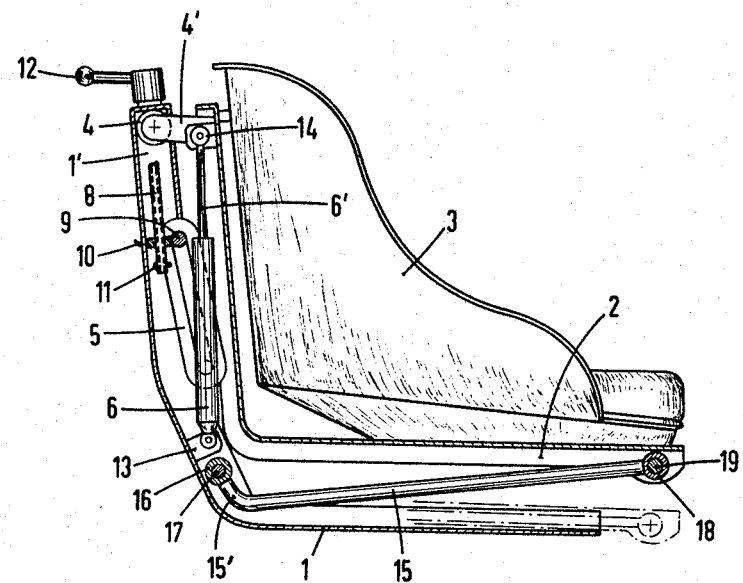
FIGURE 1 shows a longitudinal section of the vehicle seat according to the invention.
Figure 2:
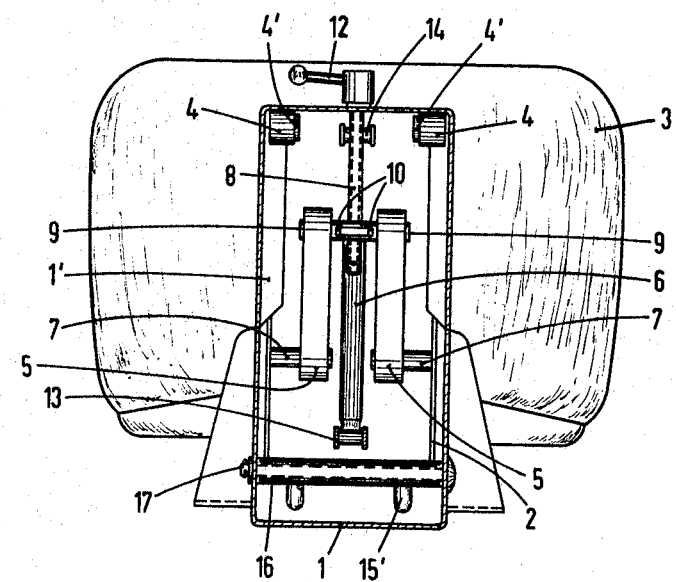
Figure 3:
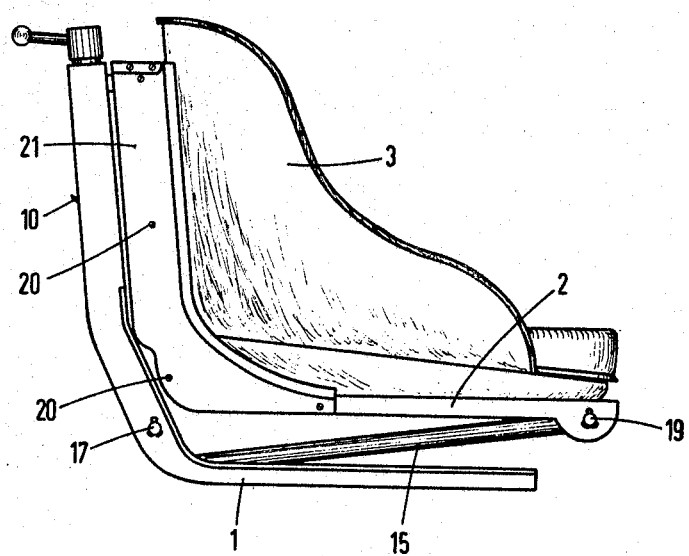
FIGURE 3 shows a side view of the seat.

As illustrated in the drawings, the vehicle seat according to the invention consists primarily of a substantially L-shaped mounting frame 1 and a similarly L-shaped supporting frame 2. The mounting frame 1 serves for mounting the entire seat on the vehicle, while the supporting frame 2 supports a bucket seat 3. In place of the bucket seat 3, it is, however, also possible to provide a frame into which a seat member is clamped. Frames 1 and 2 form the essential parts of a housing which encloses the spring elements which will be subsequently described in detail. This housing further contains two guide rollers 4 which are rotatably mounted on brackets 4' which project from the supporting frame 2 into the inside of the housing. Each of these rollers is therefore individually mounted. For this purpose, the lateral sides of frame 1 adjacent to the rollers 4 are made of a U-shaped cross section and form guide rails 1 for these rollers. As shown in FIGURE 2, each of these guide rails 1' is closed upwardly by the upper wall of the housing and is open in the downward direction.

The resilient suspension for the supporting frame 2 relative to the mounting frame 1 is provided in the form of endless elastic cords 5 or the like, preferably of rubber, which extend substantially in a vertical direction. The movements of the supporting frame 2 relative to the mounting frame 1 are further taken up by a central shock absorber 6. At their lower ends, the elastic cords 5 are hooked over a pair of arms 7 which are secured to frame 2 and at their upper ends over the outer ends of a supporting member 9 which has a threaded bore and is screwed on an adjusting spindle 8 which is rotatably mounted in the upper wall of frame 1. The supporting member 9 is provided with two short projections 10 which extend into longitudinal slots in the rear wall of frame 1 and prevent the supporting member 9 from turning when the spindle 8 is being adjusted. The elastic cables 5 are in this manner equally suspended and extend parallel to each other. The lower end of the adjusting spindle 8 contains a cotter pin 11 which prevents the supporting member 9 from being unscrewed from the spindle 8. For operating the spindle 8, it is provided on its upper end with a handle 12 which is preferably pivotable so as not to hinder the driver of the vehicle when he bends over the back rest in order to operate an agricultural machine or implement which is connected to the vehicle.

The lower end of the shock absorber 6 is pivotably connected to a bracket 13 which is secured to the rear wall of frame 1 and projects to the inside of the housing. The free end of the piston rod 6' of the shock absorber is pivotably connected to another bracket 14 on frame 2. The upper connection of the shock absorber and the brackets 4' for the guide rollers 4 are therefore entirely independent of each other which facilitates the assembly and disassembly of the seat structure.

In order to make the entire seat structure of the lowest possible height, the rear end 15' of each of the supporting rods 15 which are located underneath the bottom of frame 2 is bent upwardly and carries a bushing 16 which is pivotably mounted on a bolt 17 which is connected to the opposite side walls of frame 1. The front end of each supporting rod 15 also carries a bushing 18 which is pivotably mounted on a bolt 19 which is connected to the front end of the supporting frame 2. Bolts 17 and 19 are prevented by cotter pins from sliding out of the frames 1 and 2.

For disassembling the seat, it is only necessary to disconnect the shock absorber 6, for example, at its upper end, to release the elastic cords 5 by turning the spindle 8 so as to screw the supporting member 9 downwardly and by then unhooking the cords from the supporting member and from the arms 7, and by then pulling out either the bolt 17 or the bolt 19 after withdrawing its cotter pin. The front edge of the seat may then be pivoted upwardly, whereupon the rollers 4 can roll downwardly along their guide rails 1' until they emerge from the open lower ends of these rails.

The lateral slots which are formed between the two frames 1 and 2 may be covered by lateral cover plates 21 which are removably secured to the frames, for example, by screws 20.

In the particular embodiment of the invention as illustrated, these cover plates 21 project forwardly over the rear side of the supporting frame 2. The front edges of the cover plates 21 brace the bucket seat 3 and they are preferably provided with a covering of rubber.

Although my invention has been illustrated and described with reference to the preferred embodiment thereof, I wish to have it understood that it is in no way limited to the details of such embodiment but is capable of numerous modifications within the scope of the appended claims.

Having thus fully disclosed my invention, what I claim is:

1. A vehicle seat structure, especially for an agricultural vehicle, comprising a seat having a backrest thereon, a substantially L-shaped frame for supporting said seat, a substantially L-shaped frame for mounting said seat and said supporting frame on the vehicle, said frames being spaced from each other so as to form the front and rear walls of a housing, at least one pair of guide rollers rotatably mounted on said supporting frame, guiding means for said rollers mounted on the rear part of said mounting frame within said housing, resilient suspension means enclosed by and extending substantially vertically within said housing and comprising elastic elements and a shock absorber each being secured at one end to the rear part of said supporting frame and at the other end to the rear part of said mounting frame, an adjusting spindle rotatably mounted in the upper end wall of said housing and extending in a substantially vertical direction within said housing, a member for suspending the upper ends of said elastic elements, threadedly mounted on said spindle so as to be longitudinally adjustable thereon, and means on the rear wall of said housing engaged with a projecting portion of said suspension member for precluding rotation of said suspension member relative to said rear wall.

2. A vehicle seat structure as defined in claim 1, in which said elastic elements consist of endless rubber cords.

3. A vehicle seat structure as defined in claim 1, in which said housing further comprises lateral and upper wall portions removably secured to one of said frames.

4. A vehicle seat structure as defined in claim 3, in which said seat comprises a bucket seat secured to said supporting frame and braced on said lateral wall portions of said housing projecting beyond the front wall thereof.

5. A vehicle seat structure as defined in claim 1, further comprising a pair of guide rods located underneath said supporting frame and pivotably connected to the front end thereof and to the back part of said mounting frame.

6. A vehicle seat structure as defined in claim 1, in which said shock absorber comprises a piston rod, said guide rollers and the free outer end of said piston rod being mounted independently of each other on the back side of said supporting frame.

7. A vehicle seat structure as defined in claim 1, in which said guide rollers are mounted separately from each other on the back side of said supporting frame.

8. A vehicle seat structure as defined in claim 1, in which said guiding means for said rollers comprise substantially U-shaped guide rails at the opposite sides of each of said rollers and open at their lower ends and forming parts of the rear side of said mounting frame, and brackets secured to and projecting from the back side of said supporting frame for rotatably mounting said rollers.

9. A vehicle seat structure as defined in claim 1, further comprising removable means on the free end of said spindle for preventing said spindle from being unscrewed from said upper suspension member.

10. A vehicle seat structure as defined in claim 1, further comprising a handle pivotably connected to the upper end of said spindle projecting from the upper side of said housing for adjusting said spindle.

11. A vehicle seat structure as defined in claim 5, further comprising at least one bolt for pivotably connecting said guide rods to the front end of the lower side of said supporting frame, and a cotter pin in at least one end of said bolt.

12. A vehicle seat structure as defined in claim 5, further comprising at least one bolt for pivotably connecting said guide rods to the rear part of said mounting frame, and a cotter pin in at least one end of said bolt.

References Cited

UNITED STATES PATENTS

| | | | |
|---|---|---|---|
| 1,770,321 | 7/1930 | Mougeotte | 297—307 |
| 2,366,730 | 1/1945 | Hickman | 297—308 |
| 2,430,604 | 11/1947 | Dorton | 297—308 |
| 2,859,063 | 11/1958 | Underland | 297—308 |
| 2,984,290 | 5/1961 | Miller | 297—308 |
| 3,109,621 | 11/1963 | Simons et al. | 297—308 |
| 3,139,304 | 6/1964 | Lehner et al. | 297—308 |

DAVID J. WILLIAMOWSKY, *Primary Examiner.*

FRANCIS K. ZUGEL, *Examiner.*